(12) United States Patent
Wang et al.

(10) Patent No.: US 12,397,854 B2
(45) Date of Patent: Aug. 26, 2025

(54) STEERING APPARATUS

(71) Applicant: ZF Active Safety and Electronics US LLC, Livonia, MI (US)

(72) Inventors: Jinbo Wang, Bloomfield, MI (US); Ramesh Chirla, Troy, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 547 days.

(21) Appl. No.: 17/948,607

(22) Filed: Sep. 20, 2022

(65) Prior Publication Data
US 2024/0092420 A1    Mar. 21, 2024

(51) Int. Cl.
*B62D 6/00*    (2006.01)
*B62D 5/04*    (2006.01)

(52) U.S. Cl.
CPC .......... *B62D 6/008* (2013.01); *B62D 5/0412* (2013.01)

(58) Field of Classification Search
CPC .............................. B62D 6/008; B62D 5/0412
See application file for complete search history.

(56) References Cited

U.S. PATENT DOCUMENTS

| 3,703,835 A | * | 11/1972 | O'Connor | ........... F16H 25/2006 |
| | | | | 74/441 |
| 3,716,110 A | * | 2/1973 | Fonda | ...................... B62D 5/04 |
| | | | | 180/428 |
| 5,174,407 A | * | 12/1992 | Shimizu | ................. B62D 1/166 |
| | | | | 180/444 |
| 2021/0309277 A1 | | 10/2021 | Huber et al. | |

FOREIGN PATENT DOCUMENTS

| EP | 1767432 A1 | * | 3/2007 | ............. B62D 1/181 |
| JP | 2005067386 A | * | 3/2005 | |
| JP | 2009292331 A | * | 12/2009 | |
| JP | 2012045978 A | * | 3/2012 | |

* cited by examiner

*Primary Examiner* — Jacob D Knutson
(74) *Attorney, Agent, or Firm* — Tarolli, Sundheim, Covell & Tummino LLP

(57) ABSTRACT

A steering apparatus is for turning steerable wheels of a vehicle. The steering apparatus includes a steering wheel rotatable about a steering axis to effect turning of the steerable vehicle wheels. A first shaft is connected to the steering wheel and rotatable about a first shaft axis. A first nut is threadably connected to and longitudinally movable along the first shaft. A second nut is connected to the first nut such that the first and second nuts are prevented from moving longitudinally relative to one another. A second shaft is rotatable about a second shaft axis. The second nut is threadably connected to and longitudinally movable along the second shaft. A motor is connected to the second shaft and controllable to apply a force to the steering wheel through the first and second shafts and the first and second nuts.

20 Claims, 3 Drawing Sheets

STEERING APPARATUS

FIELD OF THE INVENTION

The present invention relates to a steering apparatus for turning steerable wheels of a vehicle in response to rotation of a vehicle steering wheel.

BACKGROUND OF THE INVENTION

Power steering assemblies are common in modern vehicles. Typically, one or more rigid shafts connect a vehicle steering wheel to a steering rack of the power steering assembly. The rigid shafts must be routed from the vehicle steering wheel to the steering rack. Routing the rigid shafts between the steering wheel and the steering rack is often difficult, as other vehicle components must not interfere with the shafts.

Some known vehicle steering systems have eliminated the rigid shafts. Such systems are commonly referred to as "steer-by-wire" systems. In steer-by-wire systems, there is no mechanical connection between the steering wheel and the steering rack of the power steering assembly. Instead, an assembly associated with the steering wheel sends an electronic signal to the power steering assembly. The electronic signal actuates the power steering assembly. Since steer-by-wire systems have no mechanical connection, routing of the rigid shafts between the steering wheel and a steering rack is avoided.

Some known steer-by-wire systems include steering feel motors that utilize torque control to produce a desired steering feel for the vehicle operator. The torque control methodology is intuitive in that the motor will produce a resistance torque feel for the vehicle operator. A low resistance torque (e.g., 6 Nm or less) is typically sufficient for normal driving operations. Though, occasionally, a high resistance torque (e.g., 15 Nm or higher) may be desirable for parking and/or emergency maneuvers. Therefore, with torque control, a relatively high-power output (e.g., 15-30 Nm) motor is typically provided to produce a desired steering feel for both low-resistant and high-resistant torque events. Because the high-power output motor only provides resistance to the rotation of the steering wheel, the motor does not do positive work and, thus, the energy provided for actuating the motor is converted to heat, noise, vibration, and/or hardness in the steer-by-wire system.

SUMMARY OF THE INVENTION

According to an aspect of the invention, alone or in combination with any other aspect, a steering apparatus is provided for turning steerable wheels of a vehicle. The steering apparatus includes a steering wheel rotatable about a steering axis to effect turning of the steerable vehicle wheels. A first shaft is connected to the steering wheel and rotatable about a first shaft axis. A first nut is threadably connected to and longitudinally movable along the first shaft. A second nut is connected to the first nut such that the first and second nuts are prevented from moving longitudinally relative to one another. A second shaft is rotatable about a second shaft axis. The second nut is threadably connected to and longitudinally movable along the second shaft. A motor is connected to the second shaft and controllable to apply a force to the steering wheel through the first and second shafts and the first and second nuts.

According to an aspect of the invention, alone or in combination with any other aspect, a steering apparatus is provided for turning steerable wheels of a vehicle. The steering apparatus comprises a steering wheel rotatable about a steering axis to effect turning of the steerable vehicle wheels. A first shaft is connected to the steering wheel and rotatable about a first shaft axis. A first nut is threadably connected to and longitudinally movable along the first shaft. A second nut is connected to the first nut via a connector. A second shaft is rotatable about a second shaft axis. The second nut is threadably connected to and longitudinally movable along the second shaft. A coefficient of friction between the second shaft and the second nut is greater than a coefficient of friction between the first shaft and first nut. A motor is connected to the second shaft and controllable to apply a force to the steering wheel through the first and second shafts and the first and second nuts.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
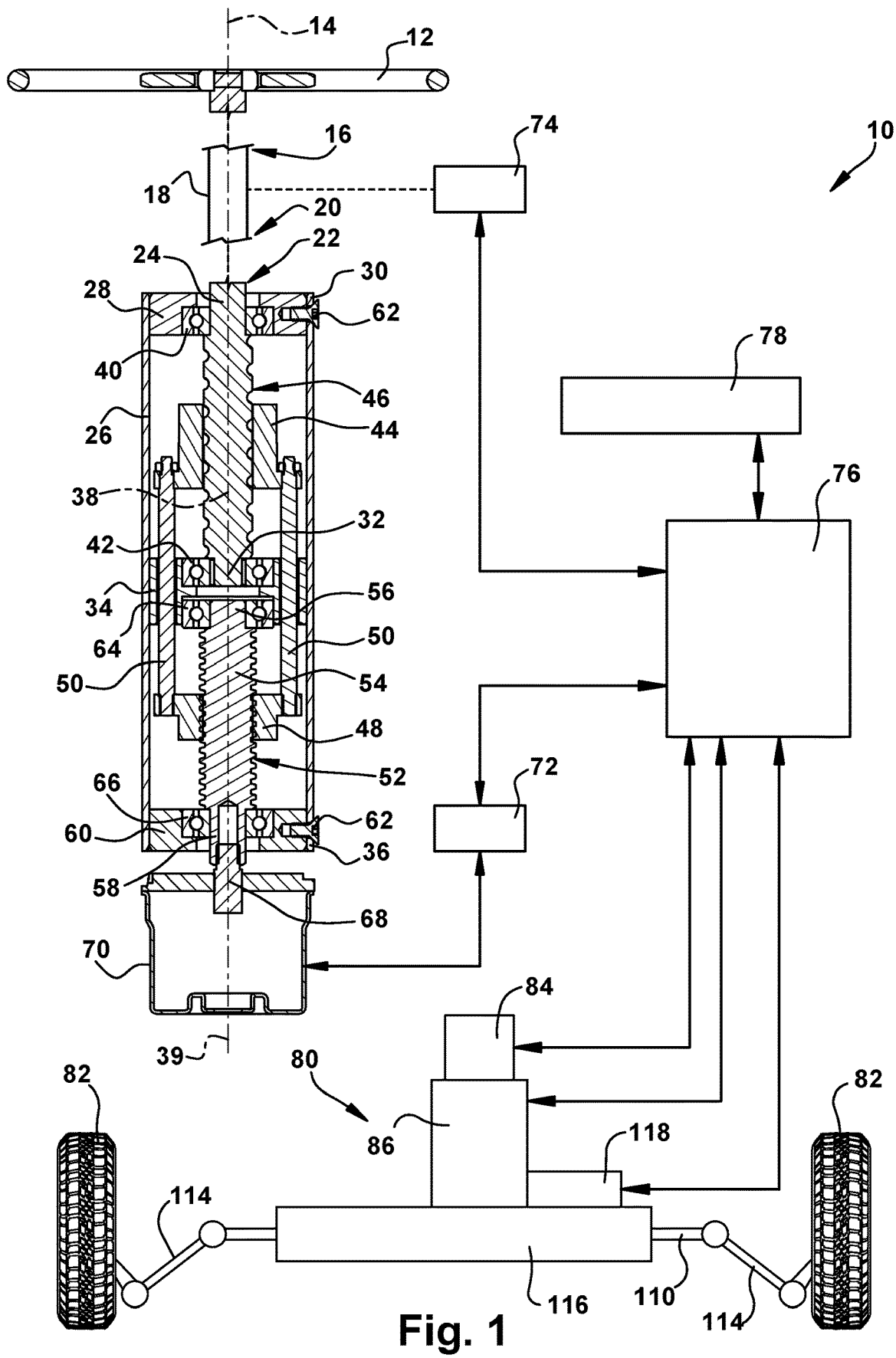
FIG. 1 is a schematic illustration of a steering apparatus for a motor vehicle.
Figure 2:
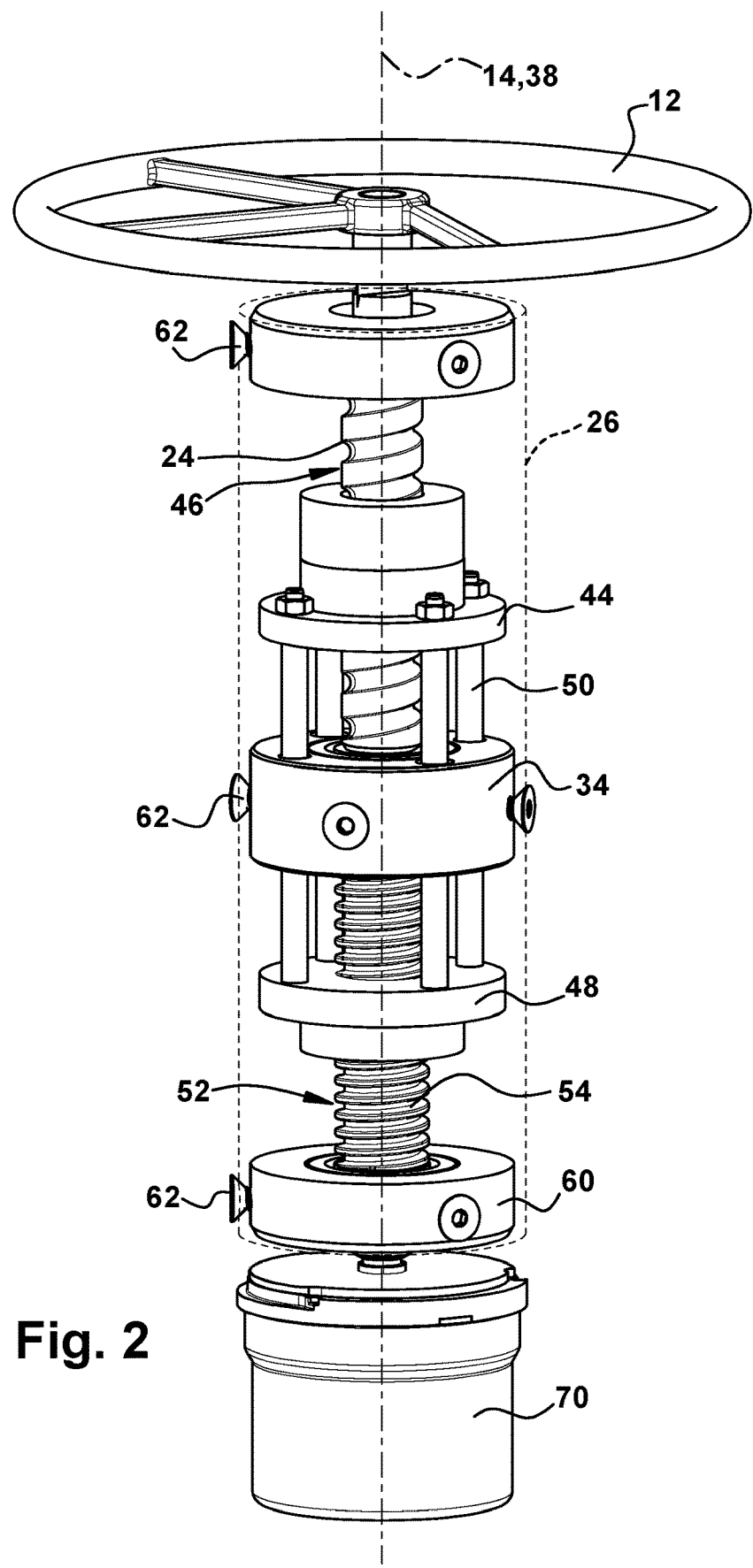
FIG. 2 is a side view of a portion of the steering apparatus of FIG. 1.

FIG. 1 schematically illustrates a steering apparatus 10 for a motor vehicle. The steering apparatus 10 illustrated in FIG. 1 is a steer-by-wire steering apparatus. However, the teachings of the present disclosure may be adapted for use in non-steer-by-wire steering apparatus. As shown in FIGS. 1-2, the steering apparatus 10 includes a steering wheel 12. The steering wheel 12 is of known construction and is manually rotatable by a vehicle operator about a steering axis 14.

A first bar end 16 of a torsion bar 18 is fixed for rotation with the steering wheel 12. The first bar end 16 may be directly fixed to the steering wheel 12, or may be indirectly fixed to the steering wheel 12 via one or more intervening components. A second bar end 20 is fixed for rotation with a first end 22 of a first shaft 24. The torsion bar 18 may be formed separately from the first shaft 24 and subsequently connected, or may be formed integrally with the first shaft 24 as one piece. Further, the torsion bar 18 and the first shaft 24 may be directly connected to one another, or indirectly connected to one another by one or more intermediate components.

The first end 22 is supported in a housing 26 via a first mount plate 28 positioned in the housing at a first housing end 30. A second end 32 of the first shaft 24 is supported in the housing 26 via a second mount plate 34 positioned in the housing between the first housing end 30 and an opposite second housing end 36. The first shaft 24 is rotatable about a first shaft axis 38 relative to the housing 26 and the mount plates 28, 34 via bearings 40, 42 (e.g., a ball bearings) that are positioned between the mount plates and the first shaft. As shown in FIGS. 1-2, the steering and first shaft axes 14, 38 may be coaxial. However, the steering and first shaft axes 14, 38 may be parallel to one another or at a non-zero degree angle relative to one another. The first shaft's connection to the housing 26 via the mount plates 28, 34 and bearings 40, 42 is designed such that the first shaft 24 is prevented from moving longitudinally (i.e., in a longitudinal direction along the first shaft axis 38) during use.

A first nut 44 is threadably connected to threading 46 on the first shaft 24. The first nut 44 is also connected to a second nut 48 via a plurality of posts 50. However, the steering apparatus 10 may include any number of posts 50 and/or any other connecting member(s) for connecting the first and second nuts 44, 48 together.

The posts 50 retain the first and second nuts 44, 48 at a predetermined distance from one another and, thus, prevent the first and second nuts from moving longitudinally relative to one another. However, because of the posts 50, longitudinal movement of one of the nuts 44, 48 in one direction causes the other nut to move in the same direction. The posts 50 not only extend through the second mount plate 34, but are prevented from rotating about a longitudinal axis (e.g., the first shaft axis 38 and/or a second shaft axis 39) by the second mount plate, which in turn prevents each of the nuts 44, 48 from rotating about a longitudinal axis (e.g., the first shaft axis 38 and/or the second shaft axis 39).

The second nut 48 is threadably connected to threading 52 on a second shaft 54 and movable along the second shaft axis 39 via rotation of the second shaft 54. As shown in FIGS. 1-2, the first and second shaft axes 38, 39 may be coaxial. However, the first and second shaft axes 38, 39 may be parallel to one another or at a non-zero degree angle relative to one another. A first end 56 of the second shaft 54 is supported in the housing 26 via the second mount plate 34. A second end 58 of the second shaft 54 is supported in the housing 26 via a third mount plate 60 positioned in the housing at the second housing end 36. Each of the mount plates 28, 34, 50 is fixed to the housing 26 via at least one fastening element 62 (e.g., a screw). The second shaft 54 is rotatable about the second shaft axis 39 relative to the housing 26 and the mount plates 34, 60 via bearings 64, 66 (e.g., a ball bearings) that are positioned between the mount plates and the second shaft. The second shaft's connection to the housing 26 via the mount plates 34, 60 and bearings 64, 66 is designed such that the second shaft 54 is prevented from moving longitudinally during use.

The second end 58 of the second shaft 54 is fixed for rotation with a drive shaft 68 of a first electric motor 70. The second end 58 may be formed separately from the drive shaft 68 and subsequently attached thereto, such as, e.g., via the drive shaft being press-fit into the second end. Alternatively, the second end 58 may be formed integrally with the drive shaft 68 as one piece. As another alternative, the second end 58 may be indirectly connected to the first electric motor 70 (e.g., to the drive shaft 68) via one or more intermediate components. For example, the second end 58 may be indirectly connected to the first electric motor 70 via a gear reduction system. The gear reduction system may include at least a worm wheel and a worm shaft. The first electric motor 70 may be of any known type suitable for use in the steering apparatus 10. For example, the first electric motor 70 may be a variable reluctance motor, a permanent magnet alternating current motor or a brushless direct current motor.

As shown in FIG. 1, the first and second shafts 24, 54 are not directly connected to one another, and may be spaced from one another. Rotation of one of the shafts 24, 54 thus does not directly cause the other shaft to rotate. However, as will be discussed in more detail below, the shafts 24, 54 are still operably connected to one another via the nuts 44, 48 and the posts 50. Further, the shaft's connection to one another may be such that rotation of one of the shafts 24, 54 in one direction indirectly causes the other shaft to rotate in the same direction. Alternatively, the threading on the shafts 24, 54 and/or the nuts 44, 48 may be configured such that the rotation of one of the shafts in one direction indirectly causes the other shaft to rotate in a second (e.g., opposite) direction. In either case, when one of the shafts 24, 54 rotates, the other shaft also rotates (however, there may be a relatively minor delay between the start of rotation of one of the shafts and the start of rotation of the other of the shafts).

A steering torque applied by the vehicle operator to the steering wheel 12 urges the first shaft 24 to rotate about the axis 38, which in turn urges the nuts 44, 48 to move longitudinally and the second shaft 54 to rotate. The first shaft 24, however, may be prevented from being rotated by the applied steering torque entirely via friction in the steering apparatus 10. In particular, a coefficient of friction between the second nut 48 and the second shaft 54 may be selected so that the second nut is prevented from moving longitudinally (and, accordingly, the second shaft is prevented from rotating) when urged to do so by the applied steering torque.

The first nut 44, through its connection to the second nut 48, is also prevented from moving longitudinally, which correspondingly prevents the first shaft 24 from rotating. In addition to the friction between the second nut and shaft 48, 54, a coefficient of friction between the first nut and shaft 44, 24 may be selected so that the first nut is at least partially prevented from moving longitudinally (and, accordingly, the first shaft is partially prevented from rotating) when urged to do so by the applied steering torque. Because the first shaft 24 is fixed for rotation with the second bar end 20, the first shaft prevents at least the second bar end from being rotated about the axis 38 by the steering wheel 12, which correspondingly provides a predetermined rotational resistance to the steering wheel via the torsion bar 18.

However, by including the torsion bar 18, the steering apparatus 10 is configured so that the vehicle operator can rotate the steering wheel 12 about the steering axis 14 relative to the first shaft 24. For example, the vehicle operator may be able to rotate the steering wheel 12 about 3-6° relative to the first shaft 24. Therefore, the first bar end 16 thus may twist relative to the second bar end 20 in response to a predetermined applied steering torque, thereby permitting relative rotation between the steering wheel 12 and the first shaft 24.

The first electric motor 70 may be operated to control the resistance to the rotation of the steering wheel 12 and, accordingly, is commonly referred to as a "steering feel motor." In particular, actuation of the first electric motor 70 causes the drive shaft 68 to rotate the second shaft 54 about the axis 39, thus overcoming the friction between the second shaft and the second nut 48. The second nut 48 moves along the axis 39 in accordance with the direction the second shaft 54 is rotating. The first nut 44, being connected to the second nut 48, moves in the same direction as the second nut. The longitudinal movement of the first nut 44 applies a torque (i.e., a rotational force) to the first shaft 24 that may urge the first shaft to rotate about the axis 38. The first shaft 24, when rotating, applies a torque to the second bar end 20 (and correspondingly, the entirety of the torsion bar 18) to provide steering feel. The torque applied by the first shaft 24 may be in the same direction that the vehicle operator rotates the steering wheel 12 about the steering axis 14 and, thus, may make it easier for the vehicle operator to turn the steering wheel. In doing so, the first electric motor 70 overcomes the resistance provided by the friction and reduces the amount of steering torque required by the vehicle operator to turn the steering wheel 12 about the steering axis 14 to a desired position.

The first shaft 24 and the second bar end 20 may thus be rotated by the first electric motor 70 in the same direction as the steering wheel 12 and first bar end 16 about the steering axis 14. However, the steering wheel 12 and first bar end 16 may be rotated ahead of the second bar end 20 and the first shaft 24 based on the amount of steering torque that the vehicle operator applies to the steering wheel.

Instead of the rotational resistance to the steering wheel 12 being provided entirely via friction, the first electric motor 70 may also apply rotational resistance to the steering wheel 12. In such case, the friction between the second nut 48 and the second shaft 54 (and, optionally, the friction between the first nut 44 and the first shaft 24) partially resists rotation of the first shaft by the applied steering torque in a similar manner as described above. However, because the friction is configured to provide only a portion of the resistance, the applied steering torque may at least partially overcome the friction between the first shaft and nut 24, 44 and/or the second shaft and nut 54, 48. Additional resistance, when desired, may be provided by the first electric motor 70. In particular, the first electric motor 70 may cause the first shaft 24 to apply a torque to the second bar end 20 (and correspondingly, the entirety of the torsion bar 18) that is in a direction opposite to that which the vehicle operators steering wheel 12 about the steering axis 14 and, thus, may make it harder for the vehicle operator to turn the steering wheel. In doing so, the first electric motor 70 adds to the frictional resistance to increase the amount of steering torque required by the vehicle operator to turn the steering wheel 12 about the steering axis 14 to a desired position.

The desired coefficient of friction between the first nut and shaft 44, 24 and/or between the second nut and shaft 48, 54 may be achieved via material selection, lead angle selection for the threads of the shaft(s), and/or via lead angle selection for inner threads of the nut(s). The threading 48 of the first shaft 24 may have a larger lead angle than the threading 52 of the second shaft 54. In such a configuration, the coefficient of friction between the second nut and shaft 48, 54 is greater than the coefficient of friction between the first nut and shaft 44, 24. The friction between the second nut and shaft 48, 54 thus provides more rotational resistance than the friction between the first nut and shaft 44, 24.

Having a lower coefficient of friction between the first shaft and nut 44, 24 may help to reduce the size of the first electric motor 70. This is because the first electric motor 70 may be controlled to provide "active return" or "return-to-center" functionality for the steering wheel 12. In order to provide such functionality, the first electric motor 70 has to be powerful enough to drive the second nut and shaft 48, 54 and the first nut and shaft 44, 24 to rotate the steering wheel 12 (at a certain speed and at certain acceleration) back to a central alignment position after the steering wheel is rotated. If the coefficient of friction between the first shaft and nut 44, 24 was as high as the coefficient of friction between the second shaft and nut 48, 54, the first electric motor 70 would have to be larger and more powerful in order to provide the "active return" functionality. Therefore, a steering apparatus 10 in which the coefficient of friction between the first shaft and nut 44, 24 is at least equal to the coefficient of friction between the second shaft and nut 48, 54 may require a larger and more powerful first electric motor 70 than a steering system apparatus 10 in which the coefficient of friction between the first shaft and nut is less than the coefficient of friction between the second shaft and nut.

As shown in FIG. 1, a first electronic control unit ("ECU") 72 is operably connected to the first electric motor 70. The first ECU 72 actuates and controls the first electric motor 70 to control the steering resistance (i.e., the resistance to the rotation of the steering wheel 12) provided to the steering wheel. The first ECU 72 is preferably a microcomputer. Alternatively, the first ECU 72 may be formed from discrete circuitry, an application-specific-integrated-circuit ("ASIC"), or any other type of control circuitry.

The steering apparatus 10 may include a torque/position sensor assembly that includes both the torque bar 18 and at least one torque/position sensor 74. The torque/position sensor assembly may also include a housing in which at least a portion of each of the torque bar 18 and the torque/position sensor 74 are positioned. The torque/position sensor assembly may be structurally and/or operationally positioned between the steering wheel 12 and the first shaft 24.

The torque/position sensor 74 is operatively connected to the torsion bar 18, such as, for example, to both the first and second bar ends 16, 20. Alternatively or additionally, the torque/position sensor 74 may be operatively connected to a component that is fixed for rotation with the first bar end 16 (e.g., the steering wheel 12), and/or to a component that is fixed for rotation with the second bar end 20 (e.g., the first shaft 24). The torque/position sensor 74 may be operable to sense the rotational position (i.e., rotational angle) of the first shaft 24 via the second bar end 20, the rotational position of the steering wheel 12 via the first bar end 16, and a relative rotational position (i.e., rotational angle) between the steering wheel 12 and the first shaft via a relative rotational position between the first and second bar ends. The torque/position sensor 74 may be any known sensor or group of sensors for sensing at least the above sensed parameters, and for generating signals indicative of the sensed parameters. The torque/position sensor 74 may include, for example, an optical, a magnetic and/or a mechanical sensor of known construction.

The torque/position sensor 74 may be configured to internally determine a steering torque applied to the steering wheel 12 by the vehicle operator as a function of a spring constant of the torsion bar 18 and the relative angle between the first and second bar ends 16, 20. In such case, the signals generated by the torque/position sensor 74 would include the vehicle operator applied steering torque.

A second ECU 76 is operatively coupled to the torque/position sensor 74 and to the first ECU 72. The second ECU 76 receives the signals indicative of the rotational position of the first shaft 24 from the torque/position sensor 74 and the relative rotational position between the steering wheel 12 and the first shaft. The second ECU 76 may also receive the signals from the torque/position sensor 74 indicative of the vehicle operator applied steering torque when determined by the torque/position sensor. Alternatively, the second ECU 76 may receive signals indicative of the relative angle between the steering wheel 12 and first shaft 24 and internally determine the applied steering torque as a function of those received signals and the spring constant of the torsion bar 18. In response to the signals from the torque/position sensor 74, the second ECU 76 generates and transmits a first signal corresponding to the sensed vehicle operator applied steering torque. The second ECU 76 may also be operatively connected to and communicate with a vehicle CAN bus 78. The second ECU 76 may request and/or receive certain vehicle operating characteristics, such as vehicle speed, from the vehicle CAN bus 78. The second ECU 76 is preferably a microcomputer. Alternatively, the second ECU 76 may be formed from discrete circuitry, an application-specific-integrated-circuit ("ASIC"), or any other type of control circuitry.

The steering apparatus 10 also includes a power steering system 80 configured to turn steerable vehicle wheels 82. In the example configuration of FIGS. 1 and 3, the power steering system 80 is an electric power steering system. However, the steering apparatus 10 can be configured to include other types of power steering systems besides electric (e.g., hydraulic).

The power steering system 80 includes a third ECU 84. The third ECU 84 receives the first signal from the second ECU 76. The third ECU 84 is further operatively coupled to a second electric motor 86. The third ECU 84 controls the operation of the second electric motor 86 in accordance with the first signal. For example, the third ECU 84 may run an algorithm that uses the vehicle operator applied steering torque from the first signal as a parameter for controlling the operation of the second electric motor 86. The third ECU 84 is preferably a microcomputer. Alternatively, the third ECU 84 may be formed from discrete circuitry, an application-specific-integrated-circuit ("ASIC"), or any other type of control circuitry. Although the power steering system 80 is shown and described as having a single electric motor 86 controlled by a single ECU 84, the power steering system may have any number of electric motors and ECUs for turning the steerable vehicle wheels 82.

The second electric motor 86 may be of any known type suitable for use in the steering apparatus 10. For example, the second electric motor 86 may be a variable reluctance motor, a permanent magnet alternating current motor or a brushless direct current motor.

Figure 3:
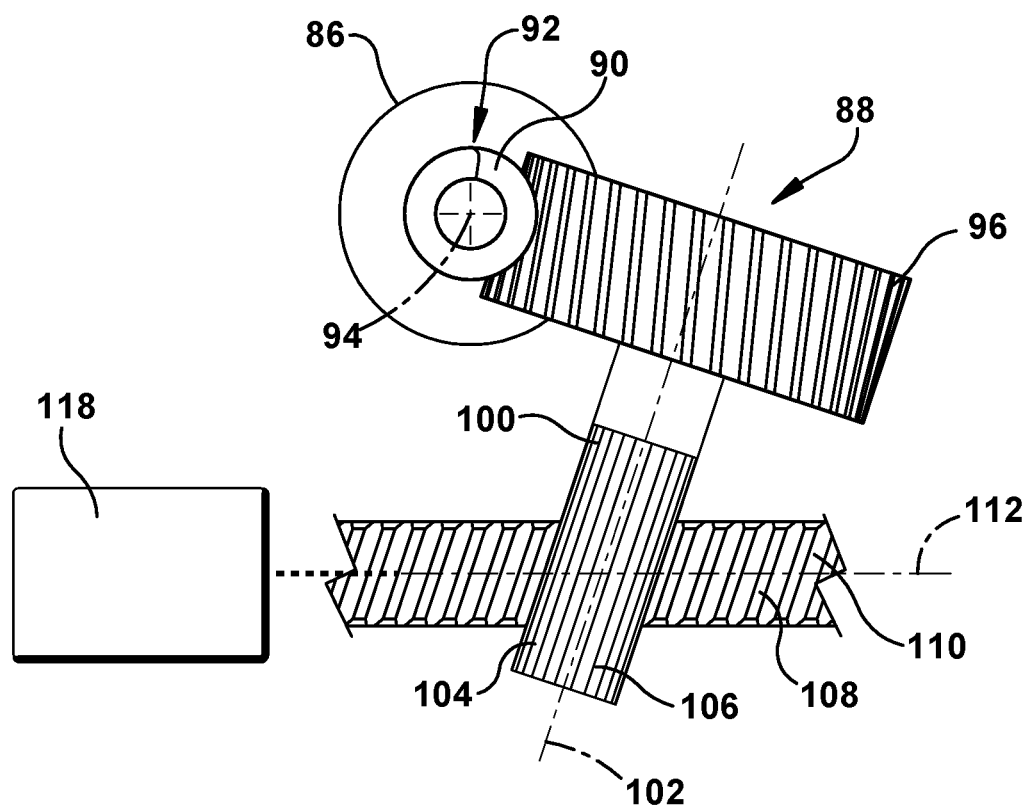
FIG. 3 is a schematic illustration of a portion of an example power steering system of the steering apparatus of FIG. 1.

The second electric motor 86 effects turning of the steerable vehicle wheels 82 through a gear assembly 88. FIG. 3 schematically depicts an example gear assembly 88 that is operably connected to the second electric motor 86. The gear assembly 88 of FIG. 3 includes a worm screw 90 that is fixed for rotation with a drive shaft 92 of the second electric motor 86. The worm screw 90 may be formed separately from the drive shaft 92 and subsequently attached, or may be formed integrally with the drive shaft as one piece. The drive shaft 92 extends along a drive shaft axis 94. The worm screw 90 rotates with the drive shaft 92 about the drive shaft axis 94.

A worm wheel 96 meshingly engages and is rotatable by the worm screw 90. The worm wheel 96 is fixed for rotation with a first pinion end 98 of a pinion 100. The worm wheel 96 may be formed separately from the first pinion end 98 and subsequently attached, or may be formed integrally with the first pinion end. The pinion 100 extends along a pinion axis 102. The first pinion end 98 rotates with the worm wheel 96 about the pinion axis 102.

A second pinion end 104 has a gear portion 106 that is meshingly engaged to a gear portion 108 of a steering rack 110. Rotation of the pinion 100 about the pinion axis 102 causes the steering rack 110 to move linearly along a rack axis 112 relative to the vehicle. As shown in FIG. 1, each end of the steering rack 110 is connected to an associated steerable wheel by a tie rod 114. Therefore, the linear movement of the steering rack 110 acts on the steerable vehicle wheels 82 through the tie rods 114 to turn the steerable vehicle wheels. The steering rack 110 may be supported by a housing 116 and may linearly move relative to the housing. At least one of the components of the gear assembly 88 may be supported in or on the housing 116.

The second electric motor 86 thus effects the turning of the steerable vehicle wheels 82 in accordance with to the first signal through the gear assembly 88. The number and type of components in the gear assembly 88 described and shown in the present disclosure is merely just one example gear assembly used to operably connect the second electric motor 86 to the steering rack 110. The gear assembly 88 may include any number and type of components necessary for operably connecting the second electric motor 86 to the steering rack 110.

As shown in FIGS. 1 and 3, the power steering system 80 may include at least one position sensor 118 for sensing a linear position of the steering rack 110 along the rack axis 112. The position sensor 118 may be any known sensor or group of sensors for sensing a linear position of the steering rack 110 along the rack axis 112 and for generating signals indicative of the sensed linear position of the steering rack. The position sensor 118 may include, for example, an optical, a magnetic and/or a mechanical sensor of known construction. As shown in FIG. 1, the position sensor 118 is operatively connected to the second ECU 76. The second ECU 76 receives the signals indicative of the linear position of the steering rack 110 from the position sensor 118.

In the illustrated embodiment, the torque/position sensor 74 is electrically connected to the third ECU 84 by the second ECU 76. The second ECU 76 generates and transfers the first signal to the third ECU 84. The third ECU 84 controls a torque output of the second electric motor 86 in accordance with the vehicle operator applied steering torque provided in the first signal. For example, the third ECU 84 may control the amount of torque outputted by the second electric motor 86 and the direction of the outputted torque. The second electric motor 86 thus is torque controlled (i.e., controlled as a function of the vehicle operator applied steering torque).

The second ECU 76 receives the signals indicative of the linear position of the steering rack 110 from the position sensor 118. Using the linear position of the steering rack 110, the second ECU 76 determines a rotational position of the first shaft 24 that directly corresponds to the linear position of the steering rack. The determination may be made by running algorithms that transform the received linear position of the steering rack 110 into a corresponding rotational position of the first shaft 24. Alternatively, the determination may be made by accessing stored reference data that includes predetermined linear positions of the steering rack 110 and predetermined rotational positions of the first shaft 24 that directly correlate to the predetermined linear positions of the steering rack.

The second ECU 76 then compares a current rotational position of the first shaft 24 (i.e., the rotational position of the first shaft that was sensed by the torque/position sensor 74 and received by the second ECU) with the determined rotational position of the first shaft that directly corresponds to the linear position of the steering rack 110. The second ECU 76 generates and transmits a second signal corresponding to the difference between the current rotational position of the first shaft 24 and the determined rotational position of the first shaft that directly corresponds to the linear position of the steering rack 110. The second signal is transmitted to the first ECU 72.

The first ECU 72 receives the second signal. In response to the second signal, the first ECU 72 controls the first electric motor 70 to rotate the first shaft 24 as a function of the difference between the first shaft's current position and the determined rotational position of the first shaft that directly corresponds to the linear position of the steering rack 110 so that the first shaft may be rotated to the rotational position that directly corresponds to the linear position of the steering rack. Therefore, the first electric motor 70 is position controlled (i.e., controlled as a function of the linear position of the steering rack 110).

The sensors 74, 118, the first electric motor 70 and the first and second ECUs 72, 76 may thus function as a closed loop position control for the first shaft 24 in that the position sensor measures the linear position of the steering rack 110, the second ECU receives a signal from the position sensor, the second ECU transmits the second signal to the first ECU, the first ECU controls the first electric motor to rotate the first shaft from a first rotational position measured by the torque/position sensor to a rotational position that directly corresponds to the linear position of the steering rack. The first electric motor 70 may be controlled to rotate the first shaft 24 until the torque/position sensor 74 senses that the first shaft is in the rotational position that directly corresponds to the linear position of the steering rack 110.

The first shaft 24 rotating to the rotational position that directly corresponds to the linear position of the steering rack 110 applies torque to the second bar end 20 (and correspondingly, to the steering wheel 12 through the torsion bar 18). The first shaft 24 may be rotated in the same direction that the vehicle operator rotates the steering wheel 12 about the steering axis 14 and, thus, may reduce the amount of steering torque required by the vehicle operator to turn the steering wheel about the steering axis to a desired position. The first electric motor 70, by rotating the first shaft 24 to the position that directly corresponds to the linear position of the steering rack 110, may thus reduce the amount of steering resistance provided to the steering wheel 12.

How much the first electric motor 70 reduces the amount of steering resistance may be a function of the speed at which the first shaft 24 is rotated by the first electric motor. The first ECU 72 may be configured to determine and control the operating speed of the first electric motor 70. Alternatively, the second ECU 76 may be configured to determine the operating speed of the first electric motor 70 and transmit that operating speed to the first ECU 72 for controlling the first electric motor. The determined operating speed of the first electric motor 70 may be a function of the rotational distance that the first shaft 24 needs to rotate in order to assume the rotational position that directly corresponds to the linear position of the steering rack 110, the speed at which the second electric motor 86 drives the steering rack 110, the amount of vehicle operator applied steering torque, the type of driving maneuver being performed by the vehicle operator (e.g., parking, turning, and/or slight veering), and/or other vehicle characteristics, such as the vehicle speed.

In case of a failure of the first shaft 24, the first nut 44, the second nut 48, the posts 50, the second shaft 54, the first electric motor 70 and/or the first ECU 72, the first electric motor may not be functional to rotate the first shaft to a rotational position that corresponds to the linear position of the steering rack 110. In this case, the vehicle operator applied steering torque is still determined and sent to the power steering system 80 for controlling the steerable vehicle wheels 82 accordingly. Operation of the power steering system 80, the steering apparatus 10 and/or the vehicle may be adjusted in response to the failure.

Instead of being torque controlled, the second electric motor 86 may be positioned controlled. In such case, the torque/position sensor 74 may transmit a signal indicative of the rotational position of the steering wheel 12 to the second ECU 76, and the position sensor 118 may transmit a signal indicative of the linear position of the steering rack 110 to the second ECU. Using the rotational position of the steering wheel 12, the second ECU 76 determines a linear position of the steering shaft 110 that directly corresponds to the linear position of the steering wheel. The determination may be made by running algorithms that transform the rotational position of the steering wheel 12 into a corresponding linear position of the steering shaft 110. Alternatively, the determination may be made by accessing stored reference data that includes predetermined rotational positions of the steering wheel 12 and predetermined linear positions of the steering rack 110 that directly correlate to the predetermined rotational positions of the steering wheel.

The second ECU 76 then compares a current linear position of the steering rack 110 (i.e., the linear position of the steering rack that was sensed by the position sensor 118 and received by the second ECU) with the determined linear position of the steering rack that directly corresponds to the rotational position of the steering wheel 12. The second ECU 76 generates and transmits a signal corresponding to the difference between the current linear position of the steering rack 110 and the determined linear position of the steering rack that directly corresponds to the rotational position of the steering wheel 12. The signal is transmitted to the third ECU 84.

The third ECU 84 receives the signal. In response to the signal, the third ECU 84 controls the second electric motor 86 to linearly move the steering rack 110 as a function of the difference between the steering rack's current position and the determined linear position of the steering rack that directly corresponds to the rotational position of the steering wheel 12 so that the steering rack may be moved to the linear position that directly corresponds to the rotational position of the steering wheel. The second electric motor 86 may be controlled to linearly move the steering rack 110 until the position sensor 118 senses that the steering rack is in the linear position that directly corresponds to the rotational position of the steering wheel. Therefore, the second electric motor 86 may be position controlled (i.e., controlled as a function of the rotational position of the steering wheel 12).

Instead of being position controlled, the first electric motor 70 may be controlled as a function of an estimated steering rack load. In such case, a current of the second electric motor 86 may be sensed internally and/or via the third ECU 84. The current of the second electric motor 86 may directly or indirectly correspond to how much effort it takes for the second electric motor to linearly move the steering rack 110 to the appropriate linear position. The third ECU 84 transmits a signal indicative of the current to the second ECU 76. In response to the signal from the third ECU 84, the second ECU 76 determines an estimated steering rack load as a function of the current of the second electric motor 86. The determination may be made by running algorithms that transform the current of the second electric motor 86 into a corresponding estimated steering rack load. The second ECU 76 then generates and transmits a signal indicative of the estimated steering rack load to the first ECU 72.

The first ECU 72 receives the signal and controls a torque output of the first electric motor 70 in accordance with the estimated steering rack load provided in the signal. For example, the first ECU 72 may run an algorithm that uses the estimated steering rack load from the signal as a parameter for controlling the operation of the first electric motor 70, and then control the amount and the direction of torque outputted by the first electric motor accordingly. The first electric motor 70 thus may be steering rack load controlled (i.e., controlled as a function of the estimated steering rack load). Further, because the torque output of the first electric motor 70 corresponds to the estimated steering rack load, the torque applied to the steering wheel 12 via the first electric motor also corresponds to the estimated steering rack load. The torque output of the first electric motor 70 may be monitored via the torque/position sensor 74 (and adjusted in accordance with the sensed measurements of the torque/position sensor 74) to help produce a correspondence between the estimated steering rack load and the torque applied to the steering wheel 12 via the first electric motor 70.

In addition to providing steering feel, the first electric motor 70 can be controlled via the first ECU 72 to limit the degree to which the steering wheel 12 may be rotated in each direction about the steering axis 14 and, thus, may function in addition to or in place of a separate mechanical rotational end stop for the steering wheel. In particular, once the steering wheel 12 is rotated a predetermined degree in one direction, the first ECU 72 may control the first electric motor 70 to prevent any further rotation of the steering wheel 12 in the same direction. In one example configuration, the first ECU 72 may "turn off" the first electric motor 70 so that the friction between at least the second nut and shaft 48, 54 prevents any further rotation of the steering wheel 12 in the one direction. Alternatively, the first ECU 72 may drive the first electric motor 70 to provide a torque to the steering wheel 12 that acts in concert with the frictional resistance to prevent any further rotation of the steering wheel in the one direction.

From the above description of the invention, those skilled in the art will perceive improvements, changes and modifications. For example, although the power steering system 46 is described and shown as having a rack-and-pinion drive, the power steering system may include any other type of drive, such as, for example, a belt drive and/or a drive that utilizes a ball-nut assembly.

Algorithms, determinations, and/or computing processes for controlling the first electric motor 70 may be performed in either the first ECU 72 and/or the second ECU 76. Algorithms, determinations, and/or computing processes for controlling the second steering electric motor 86 may be performed in either the third ECU 84 and/or the second ECU 76.

The steering apparatus 10 may be configured with only the first and third ECUs 72, 84, and without the second ECU 76. The first and third ECUs 72, 84 would thus perform all of their respective algorithms, determinations, computing processes, control functions and directly communicate with one another. In this case, the first ECU 72 may be operatively connected to the torque/position sensor 74, generate the first signal, and transmit the first signal. Similarly, the third ECU 84 may be operatively connected to the position sensor 118. The third ECU 84 may generate a signal indicative of the linear position of the steering rack 110, and transmit that signal to the first ECU 72. The first ECU 72, after receiving the signal from the third ECU 84, may then perform all processes necessary for controlling the first electric motor 70.

The functions of the ECUs 72, 76, 84 can be divided between the ECUs as described above, or can be distributed among the ECUs in a different manner. The three ECUs 72, 76, 84 can be located at any physical location in the vehicle. The three ECUs 72, 76, 84 can be combined into two or one ECU located at any physical location in the vehicle.

Also, although a torsion bar 18 has been provided to permit the steering wheel 12 to rotate relative to the second gear, the steering apparatus 10 may utilize structures other than the torsion bar 18 to permit such relative movement. Such improvements, changes and modifications within the skill of the art are intended to be covered by the appended claims.

Having described the invention, the following is claimed:

1. A steering apparatus for turning steerable wheels of a vehicle, the steering apparatus comprising:
 a steering wheel rotatable about a steering axis to effect turning of the steerable vehicle wheels;
 a first shaft connected to the steering wheel and rotatable about a first shaft axis;
 a first nut threadably connected to and longitudinally movable along the first shaft;
 a second nut connected to the first nut such that the first and second nuts are prevented from moving longitudinally relative to one another;
 a second shaft rotatable about a second shaft axis, the second nut being threadably connected to and longitudinally movable along the second shaft; and
 a motor connected to the second shaft and controllable to apply a force to the steering wheel through the first and second shafts and the first and second nuts.

2. The steering apparatus recited in claim 1, wherein rotation of the second shaft via the motor causes the second nut to move along the second shaft in a first direction, movement of the second nut in the first direction causing the first nut to move along the first shaft in the first direction.

3. The steering apparatus recited in claim 2, wherein the first nut moving along the first shaft applies a torque to the first shaft that urges the first shaft to rotate about the first shaft axis.

4. The steering apparatus recited in claim 1, a lead angle of threading of the first shaft being greater than a lead angle of threading of the second shaft.

5. The steering apparatus recited in claim 1, wherein a coefficient of friction between the first nut and the first shaft being less than a coefficient of friction between the second nut and the second shaft.

6. The steering apparatus recited in claim 1, wherein the first and second nuts are connected and prevented from moving relative to one another via a post.

7. The steering apparatus recited in claim 1, wherein the first and second shafts are spaced from one another.

8. The steering apparatus recited in claim 1, wherein the motor is controllable to limit the degree to which the steering wheel may be rotated in each direction about the steering axis.

9. The steering apparatus recited in claim 1, further comprising a housing, the first nut, the second nut, a portion of the first shaft and a portion of the second shaft being in the housing, the first and second shafts being rotated about the first and second shaft axes relative to the housing.

10. The steering apparatus recited in claim 1, wherein rotational resistance to the steering wheel is provided entirely via friction.

11. The steering apparatus recited in claim 1, wherein rotational resistance to the steering wheel is provided via both friction and the motor.

12. The steering apparatus recited in claim 1, wherein the first and second shaft axes are coaxial.

13. The steering apparatus recited in claim 1, further comprising a torsion bar having a first bar end connected to the steering wheel and a second bar end connected to the first shaft, the first bar end twisting relative to the second bar end in response to a predetermined steering torque applied to the steering wheel, the twisting of the torsion bar permitting the steering wheel to rotate about the steering axis relative to the first shaft.

14. The steering apparatus recited in claim 1, wherein the motor controls the amount of steering resistance provided to the steering wheel by applying a force to the steering wheel through the first and second shafts and the first and second nuts.

15. The steering apparatus recited in claim 1, further comprising:
a first sensor for determining a steering torque applied to the steering wheel by the vehicle operator; and
a power steering system configured to turn the steerable vehicle wheels in accordance with the determined steering torque, the power steering system having a second sensor for sensing a position of a portion of the power steering system, the motor being controlled in accordance with the sensed position.

16. The steering apparatus recited in claim 15, wherein the power steering system includes a steering rack connected to the steerable vehicle wheels and linearly movable along a rack axis relative to the vehicle, the second sensor sensing a linear position of the steering rack along the rack axis, the motor being controlled in accordance with the sensed linear position of the steering rack.

17. The steering apparatus recited in claim 15, wherein the power steering system includes a second motor operably connected to a steering rack and configured to linearly move the steering rack along a rack axis, an output of the second motor being controlled in accordance with the determined steering torque.

18. The steering apparatus recited in claim 1, further comprising:
a first sensor for determining a rotational position of the steering wheel; and
a power steering system configured to turn the steerable vehicle wheels in accordance with the determined rotational position of the steering wheel, the power steering system including a second motor operably connected to a steering rack and configured to linearly move the steering rack along a rack axis, an estimated steering rack load of the steering rack being determined as a function of a current of the second motor, the motor being controlled in accordance with the estimated steering rack load.

19. The steering apparatus recited in claim 1, wherein the steering apparatus is a steer-by-wire steering apparatus.

20. A steering apparatus for turning steerable wheels of a vehicle, the steering apparatus comprising:
a steering wheel rotatable about a steering axis to effect turning of the steerable vehicle wheels;
a first shaft connected to the steering wheel and rotatable about a first shaft axis;
a first nut threadably connected to and longitudinally movable along the first shaft;
a second nut connected to the first nut via a connector;
a second shaft rotatable about a second shaft axis, the second nut being threadably connected to and longitudinally movable along the second shaft, a coefficient of friction between the second shaft and the second nut being greater than a coefficient of friction between the first shaft and first nut; and
a motor connected to the second shaft and controllable to apply a force to the steering wheel through the first and second shafts and the first and second nuts.

* * * * *